United States Patent
Sumser et al.

US006378305B1

(10) Patent No.: US 6,378,305 B1
(45) Date of Patent: Apr. 30, 2002

(54) INTERNAL COMBUSTION ENGINE HAVING AN EXHAUST-GAS TURBOCHARGER AND A METHOD FOR OPERATING SAME

(75) Inventors: Siegfried Sumser, Stuttgart; Werner Rumez, Muehlacker, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/588,787

(22) Filed: Jun. 6, 2000

(30) Foreign Application Priority Data

Jun. 29, 1999 (DE) .......................... 199 29 946

(51) Int. Cl.[7] .............................. F02D 23/00
(52) U.S. Cl. .................. 60/602; 60/600; 60/605.1; 60/605.2; 415/159; 415/160; 415/163; 415/164
(58) Field of Search ................ 60/602, 600, 605.1, 60/605.2, 611; 415/159, 160, 163, 164

(56) References Cited

U.S. PATENT DOCUMENTS

| 1,643,099 A | * | 9/1927 | Thomann | 415/163 |
|---|---|---|---|---|
| 4,820,118 A | * | 4/1989 | Yano et al. | 415/164 |
| 4,867,637 A | | 9/1989 | Hayama | 415/164 |
| 4,880,351 A | * | 11/1989 | Inoue et al. | 415/164 |
| 5,346,359 A | * | 9/1994 | Propst | 415/163 |
| 5,498,128 A | * | 3/1996 | Baets et al. | 415/164 |
| 6,050,093 A | * | 4/2000 | Daudel et al. | 60/602 |
| 6,058,706 A | * | 5/2000 | Aschner et al. | 60/600 |
| 6,082,325 A | * | 7/2000 | Digeser et al. | 60/602 |
| 6,209,324 B1 | * | 4/2001 | Daudel et al. | 60/605.2 |

FOREIGN PATENT DOCUMENTS

| DE | 195 43 190 | | 5/1997 | | |
|---|---|---|---|---|---|
| EP | 454943 A | * | 1/1991 | | 60/602 |
| JP | 404132899 A | * | 5/1992 | | 415/160 |

* cited by examiner

Primary Examiner—Thomas Denion
Assistant Examiner—Thai-Ba Trieu
(74) Attorney, Agent, or Firm—Crowell & Moring LLP

(57) ABSTRACT

An internal combustion engine having an exhaust-gas turbocharger is provided. The exhaust-gas turbocharger includes a variable turbine geometry that allows for a greater range of use. The exhaust-gas turbocharger is used as a throttling device to dimension the combustion-air quantity delivered to the engine. The variable turbine geometry can be adjusted in such a way that the direction of rotation of the rotor of the exhaust-gas turbocharger is reversed. The intake pressure in the air inlet of the internal combustion engine is set as a function of the direction of rotation of the rotor.

12 Claims, 3 Drawing Sheets

INTERNAL COMBUSTION ENGINE HAVING AN EXHAUST-GAS TURBOCHARGER AND A METHOD FOR OPERATING SAME

BACKGROUND OF THE INVENTION

1. Technical Field

The present invention relates in general to motor vehicles. More particularly, the invention relates to a method for operating an internal combustion engine having an exhaust-gas turbocharger. More specifically, but without restriction to the particular embodiment and/or use which is shown and described for purposes of illustration, the present invention relates to a method for setting the combustion air quantity and exhaust-gas turbocharger for an internal combustion engine.

2. Discussion

The publication DE 195 43 190 A1 discloses an exhaust-gas turbocharger, the turbine of which has a turbine geometry capable of being set variably via an adjustable guide-vane cascade. The guide-vane cascade comprises guide vanes which can be set with the aid of an actuator in such a way that the effective turbine inlet cross section of the turbine is modified. It is thereby possible to implement high exhaust-gas back pressures of differing amount in the section between the cylinder outlet and the exhaust-gas turbocharger. Therefore, the output of the turbine and the output of the compressor can be set according to current requirements.

Shut-off bodies can be moved into the interspaces between the guide vanes of the guide-vane cascade, with the result that the effective turbine inlet cross section is additionally reduced and, correspondingly, the exhaust-gas back pressure is additionally increased. The shut-off bodies are inserted into the interspaces between the guide vanes in order to reduce the inlet cross section to a minimum. Therefore, in an engine braking mode, the exhaust-gas back pressure necessary for the desired braking action is achieved in the exhaust tract.

Depending on the mode of operation and the operating state of the internal combustion engine, the rotor output of the exhaust-gas turbocharger is influenced by the corresponding setting of the variable turbine geometry. The charging pressure is maintained at a settable excess-pressure level above the ambient pressure via the rotor output.

The supply of combustion air into the inlet of the cylinders is determined not only by the charging pressure, but also by the position of the throttle valve in the intake tract. It is necessary for the modes of operation of the throttle valve and of the exhaust-gas turbocharger, in particular of the variable turbine geometry, to be coordinated with one another so that an optimum fuel/air ratio can be maintained.

A further exhaust-gas turbocharger with variable turbine geometry is known from the publication U.S. Pat. No. 4,867,637. The turbine geometry consists of a radial guide-vane cascade with guide vanes which are distributed over the circumference and can each be pivoted about their fastening axes through an angle of at most 30° between a closing position and an opening position. The increase in cross section due to the pivoting of the guide vanes causes the exhaust-gas back pressure to be reduced and maintained at a level which does not damage the components.

The problem on which the invention is based is to provide a greater range of use for exhaust-gas turbochargers with variable turbine geometry.

SUMMARY OF THE INVENTION

According to the novel method for setting the combustion-air quantity, the direction or rotation of the rotor of the exhaust-gas turbocharger is set as a function of the current state variables and operating variables of the internal combustion engine and of the associated assemblies. It is possible, by reversing the direction of rotation of the rotor, to generate a vacuum in the cylinder inlet. In this mode of operation, the compressor functions as a throttling device, and the throttling capacity can be adapted to current requirements via the variable turbine geometry.

Depending on the position of the variable turbine geometry and on the corresponding direction of rotation of the rotor, excess pressure or a vacuum is generated in the intake tract downstream of the compressor. The generation of the vacuum makes it possible to extend the possibilities for using the exhaust-gas turbocharger in a throttling mode, in addition to the charging or compression mode already known in the art. The novel possibility for using the exhaust-gas turbocharger allows the compressor to be employed as a throttling device, so that, in principle, it is possible to dispense with a throttle valve in the intake tract and regulate the dimensioning of the air supply solely via the charger. In so doing, in addition to a simplified design, the advantage that intake pressure can be set acccurately and continuously both in the compression range and in the throttling range is achieved.

In an expedient version, use of the exhaust-gas turbocharger in the throttling range is combined with the use of a throttle valve, so that the respective best behaviour of the supercharger and throttle valve can be utilized at selected operating points. Both the fuel consumption and the dynamic behavior of the engine may be influenced beneficially thereby.

In one form, a combined use of the throttle valve and turbocharger is conducted in an advantageous manner. In the entire compression range when the intake pressure is at the excess-pressure level, the regulation of the air quantity is carried out by the turbocharger. In the throttling range when the intake pressure is at the vacuum level, but above an intake-pressure limit value, the regulation of the air quantity is carried out solely via the setting of the exhaust-gas turbocharger. In this operating range, the throttle valve remains completely open and air metering is regulated solely via the setting of the charger.

By contrast, in a lower load range below the intake-pressure limit value, to shift the guide-vane cascade position of the turbine into the opening position and carry out air metering via the setting of the throttle valve. Serious disadvantages in the transient behaviour of the exhaust-gas turbocharger in the lower load range can thereby be avoided.

The turbine of the exhaust-gas turbocharger according to the invention is equipped with a guide-vane cascade which is adjustable, in a state-dependent and operationally dependent manner, into a position reversing the direction of rotation of the rotor. One of the directions of rotation being assigned to the generation of excess pressure and the other direction of rotation to the generation of a vacuum in the cylinder inlet. In a middle position between the stop positions, the rotor is stationary, no appreciable excess pressure or vacuum is generated, and ambient pressure prevails in the intake tract downstream of the compressor. In the two stop positions, the rotor rotates in opposite directions of rotation, and, in the range between one of the stop positions and the middle position, in each case only compression excess pressure or a throttling vacuum is generated. The magnitude of the excess pressure or vacuum depends on the current position of the various turbine geometry.

In an advantageous refinement, the guide-vane cascade has adjustable guide vanes which are adjustable, in particular through up to 180°, between two opposite stop positions.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

DETAILED DESCRIPTION OF THE PREFERRED EMBODIMENT

An internal combustion engine having a exhaust-gas turbocharger and a method for operating same is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
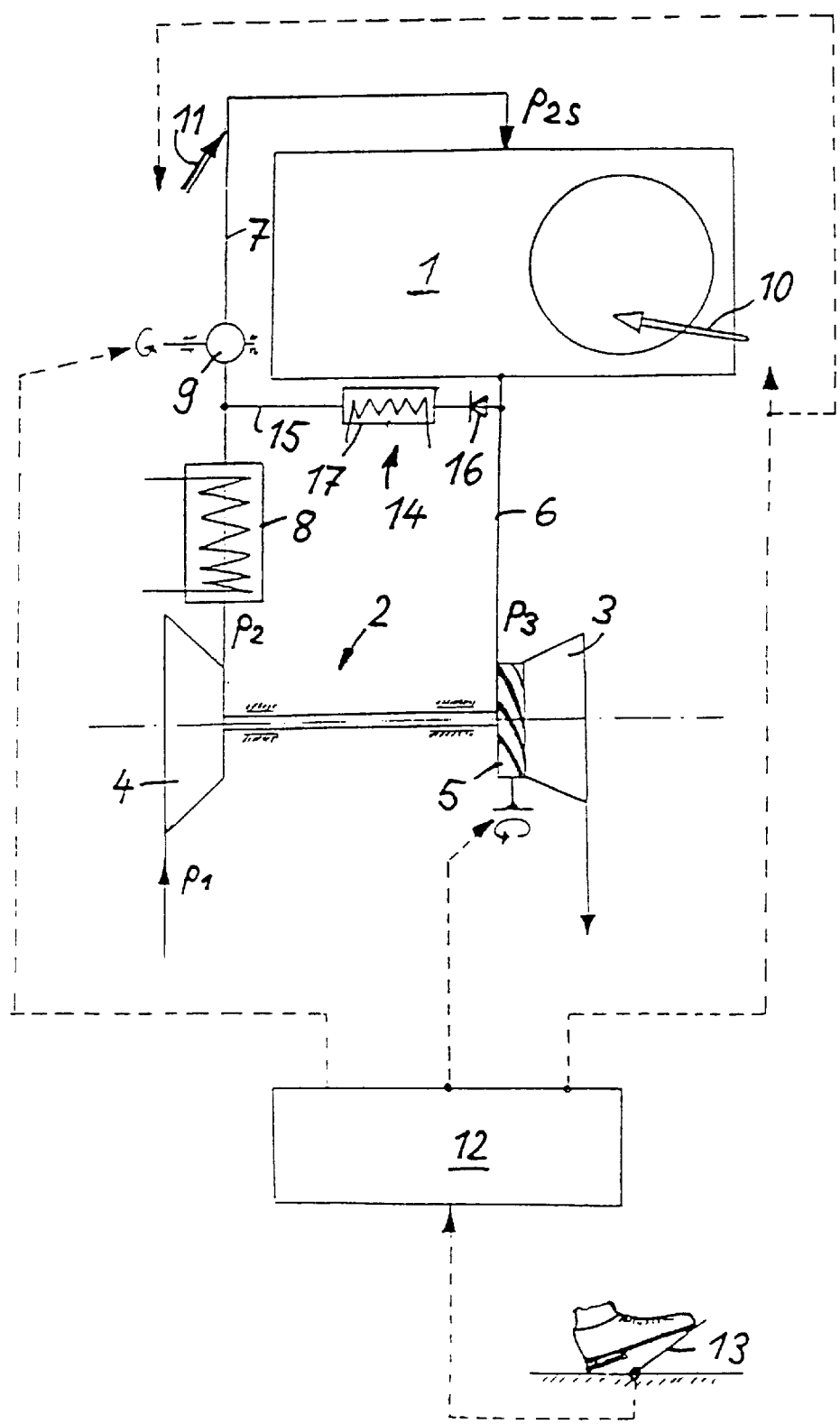
FIG. 1 depicts a diagrammatic illustration of an internal combustion engine with an exhaust-gas turbocharger having variable turbine geometry.

According to FIG. 1, the internal combustion engine 1 has an exhaust-gas turbocharger 2 with a turbine 3 in the exhaust tract 6 and a compressor 4 in the intake tract 7. The turbine 3 is equipped as a radial turbine with a variably settable turbine geometry in the form of a radial guide-vane cascade 5 with adjustable guide vanes. The turbine 3 is driven by the exhaust gases in the exhaust tract 6 between the cylinder outlet of the internal combustion engine and the turbine inlet, the said exhaust gases being under the exhaust-gas back pressure $p_3$. The turbine rotation is transmitted via a shaft to the compressor 4 which compresses the fresh air sucked in at atmospheric pressure $p_1$ to an increased pressure $p_2$. The compressed air is cooled in a charge-air cooler 8 downstream of the compressor 4 and is subsequently supplied, at the charging or intake pressure $p_{2s}$, to the suction pipe of the internal combustion engine 1. The increased intake pressure $p_{2s}$ leads to a rise in the engine drive power.

Arranged in the intake tract 7 is a throttling device 9, designed, preferably, as a throttle valve by which the air supply to the internal combustion engine 1 can be set. The fuel quantity supplied to the combustion spaces of the engine is dimensioned as a function of the air supply and is preferably supplied via direct injection 10, but, if appropriate, via suction-pipe injection 11.

The functions of the variable turbine geometry of the turbine 3, of the throttling device 9 and of the injection 10 or 11 are coordinated in a control system 12. The control system 12 processes the current position of an accelerator pedal 13 as an input signal and, according to a filed calculation instruction, determines actuating signals for setting the said assemblies.

It may be expedient to provide exhaust-gas recirculation 14 which consists of a connecting line 15 between the exhaust tract 6 and the intake tract 7, of a settable valve 16 and of a cooler 17.

In addition to the fired drive mode, the exhaust-gas turbocharger 2 may also be utilized in the engine-braking mode in order to generate engine-braking power. For this purpose, the guide-vane cascade 5 of the turbine 3 is transferred into a built-up position, in which the effective turbine inlet cross section is reduced. An increased exhaust-gas back pressure $p_3$ is thereupon built up, and the exhaust gas flows at increased velocity through ducts between the guide vanes of the guide-vane cascade 5 and impinges on to the turbine wheel driving the compressor 4, with the result that an excess pressure is built up in the intake tract 7. At the same time, brake valves on the cylinder outlet of the internal combustion engine 1 are opened, so that air compressed in the cylinder can be blown off into the exhaust tract 6 counter to the increased exhaust-gas back pressure $p_3$.

The variable turbine geometry may also be implemented by an axially displaceable guide-vane cascade instead of the rotatable guide vanes. In this case, the cross section is set as a result of an axial displacement of the guide-vane cascade.

The drive power and the brake power can be influenced by the position of the guide vanes of the guide-vane cascade 5 and the resulting setting of the turbine inlet cross section. The rotational speed of the rotor of the charger 2 and, consequently, the output of the compressor 4 depend on the exhaust-gas back pressure $p_3$ in the exhaust tract 6 and on the approach flow to the variable turbine geometry.

According to the invention, there is a provision for the drive of the supercharged internal combustion engine 1 to be set in a wide operating range of the engine via the setting of the position of the variable turbine geometry of the exhaust-gas turbocharger 2, in the respective range the throttle valve 9 being shifted into its widest opening position and being held in this position. The air supply to the internal combustion engine 1 is controlled or regulated in this range preferably solely via the setting of the variable turbine geometry.

The direction of rotation of the rotor of the exhaust-gas turbocharger 2 can be reversed by means of corresponding manipulation of the variable turbine geometry. This allows for the generation of a vacuum in the throttling range in addition to the generation of excess pressure in the compression range. The result of the reversal in direction of rotation is that the intake pressure $p_{2s}$ falls to a vacuum level which is lower than the ambient pressure. Both the direction of rotation and the rotational speed of the supercharger are determined by the setting of the variable turbine geometry, and an associated intake pressure is established correspondingly in the air inlet of the internal combustion engine.

The dimensioning of the air supply by means of a corresponding setting of the variable turbine geometry is expediently maintained as long as sole control via the variable turbine geometry has advantages in comparison with control via the throttle valve 9. Particularly in the lower load range with an intake pressure $p_{2s}$ falling short of the ambient pressure and with a correspondingly low exhaust-gas back pressure, the wasted expenditure of the exhaust-gas turbocharger may be above that of the throttle valve 9. In this case, the supply of air is carried out via the throttle valve 9 in order to increase overall efficiency and to reduce fuel consumption and/or improve the dynamic behaviour of the engine. At the same time the exhaust-gas turbocharger is expediently deactivated by the variable turbine geometry of the charger being transferred into its neutral opening position, in which there is no pressure drop across the turbine, so that rotor rotation also cannot be generated.

The decision as to whether the air supply is set solely via the exhaust-gas turbocharger or whether the throttling device is activated depends on a predeterminable limit value being exceeded or fallen short of. In particular, a check may be made as to whether the intake pressure $p_{2s}$ exceeds an intake-pressure limit value. If this is so, the combustion-air quantity supplied is dimensioned exclusively via the setting of the exhaust-gas turbocharger. If the intake-pressure limit value is fallen short of, the supply of air takes place exclusively via the setting of the throttle valve. The limit value is preferably selected in such a way that the internal combustion engine can be set in wide ranges solely via the variable turbine geometry. The intake-pressure limit value lies, in particular, in the throttling range and assumes a value which is below the ambient pressure. The idling behaviour of the engine is expediently set by the throttle valve via a low intake-pressure limit value being predetermined.

Figure 2:
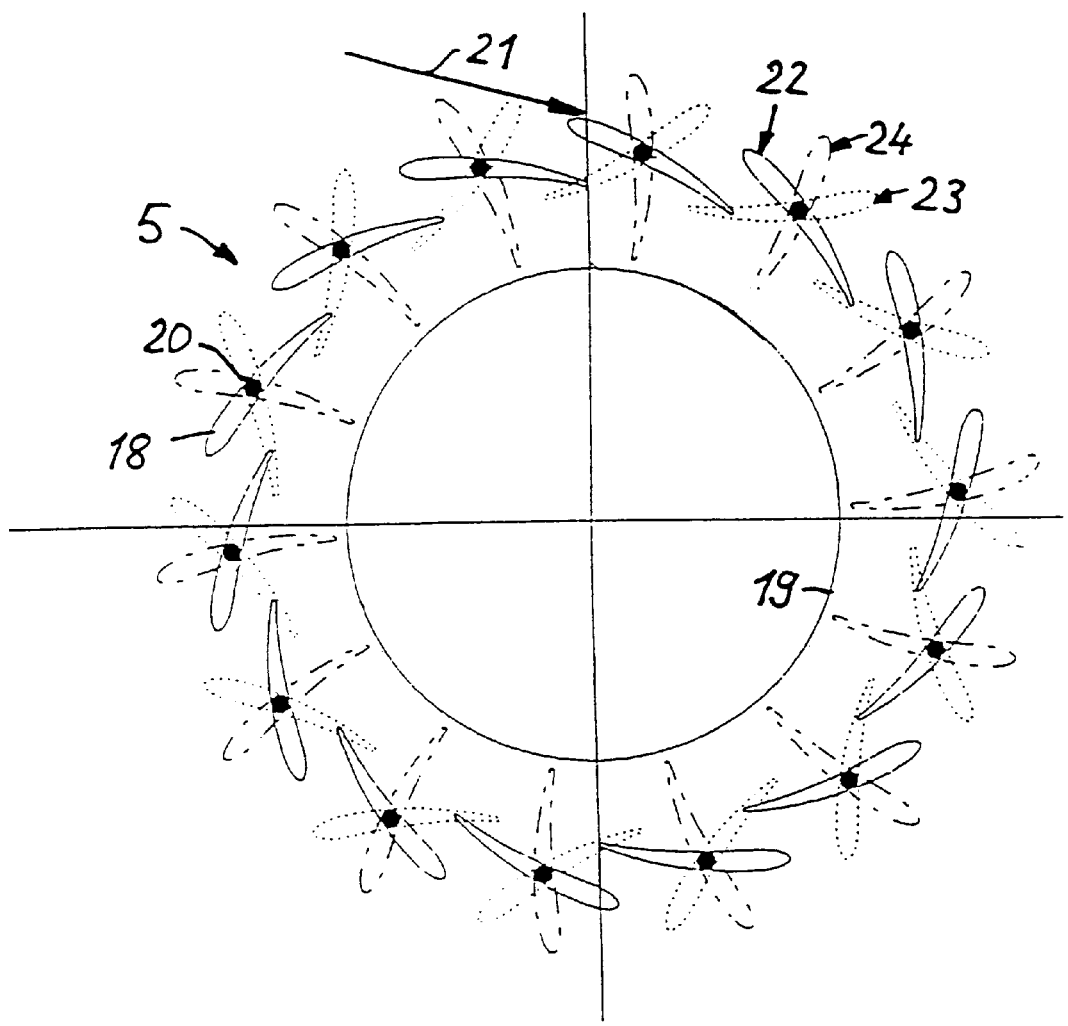
FIG. 2 illustrates a section through a guide-vane cascade of a turbine with pivotable guide vanes.

FIG. 2 shows a variable turbine geometry of a radial turbine, the said turbine geometry being designed as a radial guide-vane cascade 5 with pivotably fastened guide vanes 18. A multiplicity of guide vanes 18 are arranged over the circumference of the guide-vane cascade 5, each guide vane 18 being pivotable about its own axis of rotation 20. The axes of rotation 20 of all the guide vanes 18 are oriented parallel to one another. The guide vanes 18 can be pivoted over an angular range of up to 180° between two opposite stop positions 22, 23. In the exemplary embodiment, the angular amount between the stop positions is advantageously about 135°.

In a radial turbine equipped with a spiral housing, the inflow direction 21 is at a defined angle to the guide-vane cascade 5, but, in particular, tangential to the guide-vane cascade. If the guide vanes 18 are in the first stop position 22 illustrated by an unbroken line, and which corresponds to the compression position of the variable turbine geometry, the supercharger rotor 19 connected to the guide-vane cascade 5 is set in rotation in the usual way, thus causing the intake pressure to be compressed to an excess pressure level. If the guide vanes are in the opposite stop position 23, which is illustrated by a dotted line and corresponds to a throttling position, the rotor 19 is set in rotation in the opposite direction, whereupon a vacuum is generated in the intake tract. In a neutral middle position 24, which is between the compression position 22 and the throttling position 23 of the guide vanes 18, there is no directional exhaust-gas flow acting on the rotor, so that, because of the absence of any impetus, no rotor rotation is generated either. Correspondingly, no compressor output is released, and the intake pressure remains virtually at the level of the ambient pressure. In the neutral middle position 24, the turbine inlet cross section is in the region of the highest value; starting from the middle position 24, the turbine inlet cross section is reduced when the guide vanes 18 are pivoted both in the direction of the compression position 22 and in the direction of the throttling position.

Figure 3:
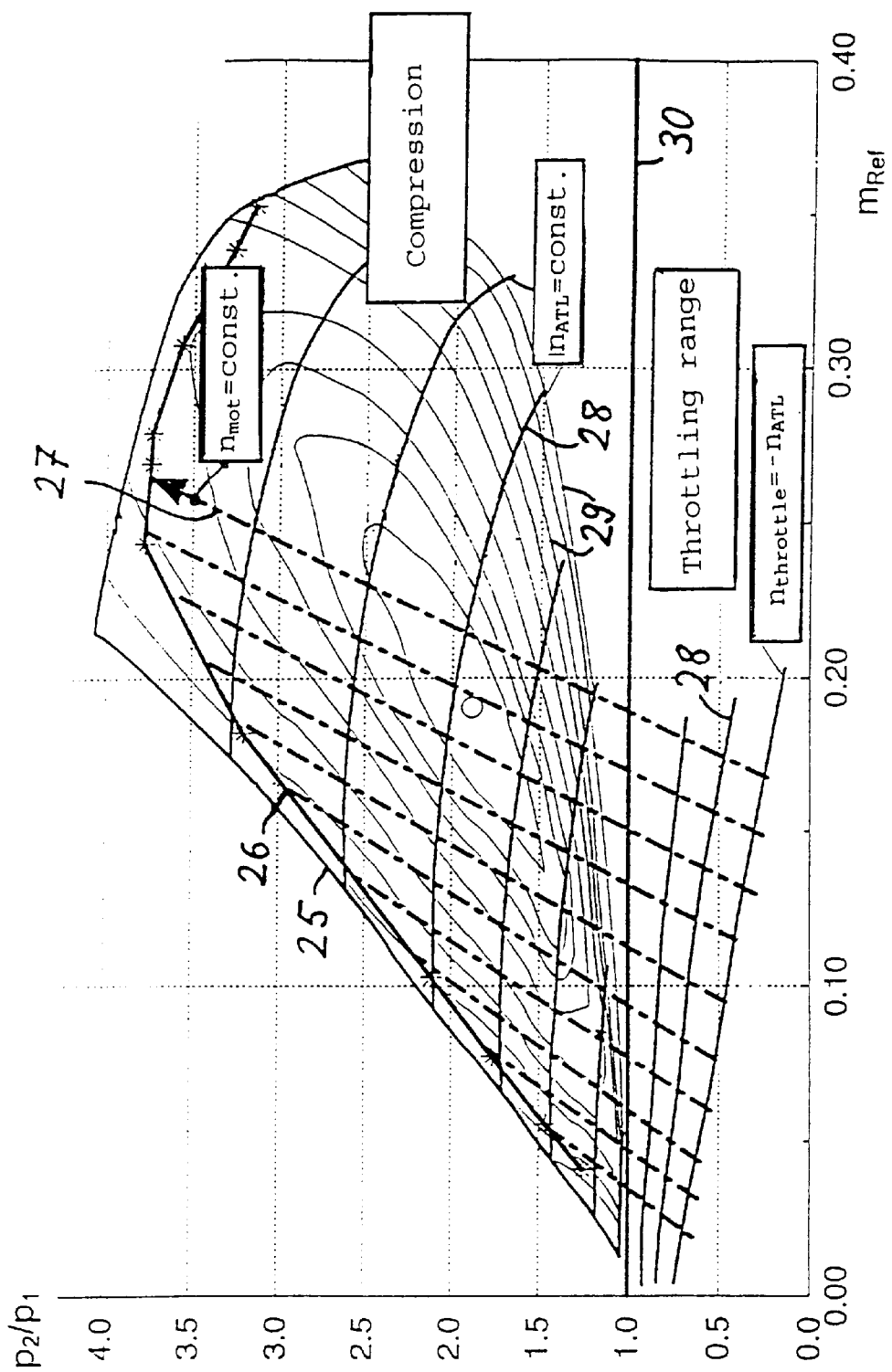
FIG. 3 illustrates a compressor characteristic map, extended to a throttling range, of an exhaust-gas turbocharger.

The compressor characteristic map according to FIG. 3 shows the pressure ratio $p_2/p_1$ of the intake pressure $p_2$, prevailing directly downstream of the compressor, to the atmospheric pressure $p_1$, prevailing directly upstream of the compressor, with respect to a reference mass flow $m_{ref}$ which is illustrated on the abscissa and which takes into account the reference pressure and the reference temperature under normal conditions. The compressor characteristic map is subdivided into an upper compression range with a pressure ratio $p_2/p_1$ higher than one or with an intake pressure $p_2$ higher than atmospheric pressure and a lower throttling range with a pressure ratio $p_2/p_1$ lower than one or with an intake pressure $p_2$ lower than atmospheric pressure. The compression range and the throttling range are separated by the line 30 which characterizes a neutral pressure ratio at $p_2=p_1$. The compressor characteristic map is limited upwards, in the direction of an increasing pressure ratio $p_2/p_1$, by the pumping limit 25. The actual maximum obtainable output of the compressor is illustrated by the full-load line 26 running just below the pumping limit 25. Furthermore, a plurality of rotational speed lines 28 with a constant turbocharger rotational speed $n_{ATL}$ are plotted in the compressor characteristic map, rotational speed lines 28 lying below the neutral pressure ratio 30 at $p_2/p_1=1$ being assigned to a throttling rotational speed $n_{throttle}$ which, on account of the reversal in direction of rotation of the rotor of the charger, is given an opposite sign to the rotational speed $n_{ATL}$ of the turbocharger. Moreover, height lines 29 are plotted, which mark regions where efficiency is constant.

The dot-and-dash lines 27 illustrate engine absorption lines which characterize the engine operating behaviour at a constant engine rotational speed $n_{mot}$ between the throttling range and the compression range. In the throttling range, with an increasing pressure ratio $p_2/p_1$, the engine absorption line approaches the line 30 representing the neutral pressure ratio; this approach is accompanied by a widening turbine inlet cross section due to the adjustment of the variable turbine geometry out of the position assigned to the lower load range in the direction of its maximum neutral opening position. The compressor generates a vacuum in the intake tract over the entire throttling range due to the reversal in rotational speed.

On the line 30, the rotor rotational speed $n_{ATL}$ of the exhaust-gas turbocharger is zero. When the line 30 is exceeded from the throttling range into the compression range, the direction of rotation of the rotor is reversed, the compressor then generating an excess pressure. At the same time, with a rising pressure ratio $p_2/p_1$ and an increasing distance from the line 30, the variable turbine geometry is adjusted in the direction of its part-closing position generating an excess pressure. When the full-load line 26 is reached, the variable turbine geometry is in the full-load position.

The method described and the device described are used preferably in spark-ignition engines, particularly in spark-ignition engines with direct petrol injection. Furthermore, however, use in diesel internal combustion engines is also possible.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An internal combustion engine having an intake tract having an intake pressure and a corresponding combustion-air quantity, said internal combustion engine also includes an exhaust tract having an exhaust pressure, said internal combustion engine comprising:

an exhaust gas turbocharger having a turbine provided in said exhaust tract and a compressor provided in said intake tract, said turbine and said compressor being interconnected, said turbine having a variable turbine geometry, said variable turbine geometry being arranged to allow said turbine to rotate in a first and second direction responsive to actuating signals from a control system which is arranged in operative connection with the turbine such that said compressor of said exhaust-gas turbocharger acts as a throttling device, said second direction being opposite of said first direction, said first direction being a compression direction that generates excess pressure in said intake tract, said second direction being a throttling direction generating a vacuum in said intake tract, wherein said intake pressure is set as a function of said first and second direction of rotation of said turbine.

2. The internal combustion engine as set forth in claim 1, wherein the rotation in said first direction defines a compression range and the rotation in said second direction defines a throttling range.

3. An internal combustion engine having an intake tract having an intake pressure and a corresponding combustion-air quantity, said internal combustion engine also includes an exhaust tract having an exhaust pressure, said internal combustion engine comprising:

an exhaust gas turbocharger having a turbine provided in said exhaust tract and a compressor provided in said intake tract, said turbine and said compressor being interconnected, said turbine having a variable turbine geometry, said variable turbine geometry allows said turbine to rotate in a first and second direction such that said compressor of said exhaust-gas turbocharger acts as a throttling device, said second direction being opposite of said first direction, said first direction being a compression direction that generates excess pressure in said intake tract, said second direction being a throttling direction generating a vacuum in said intake tract, wherein said intake pressure is set as a function of said first and second direction of rotation of said turbine, wherein rotation in said first direction defines a compression range and rotation in said second direction defines a throttling range, and wherein a throttle valve is provided in said intake tract which acts as an additional throttling device to dimension the combustion-air quantity with said exhaust gas turbocharger, said throttling being carried out exclusively by said exhaust-gas turbocharger as long as an operating variable of said internal combustion engine exceeds the threshold value.

4. The internal combustion engine as set forth in claim 3, wherein dimensioning of said combustion-air quantity supplied is carried out via setting of said exhaust-gas turbocharger with said throttle valve being in an open position, while said exhaust-gas turbocharger is operating in said compression range and in said throttling range above an intake-pressure limit value.

5. The internal combustion engine as set forth in claim 4, wherein dimensioning of said combustion-air quantity supplied is carried out via the setting of said throttle valve, the variable turbine geometry being transferred into an open position while said exhaust-gas turbocharger is operating in said throttling range below said intake-pressure limit value.

6. The internal combustion engine as set forth in claim 5, wherein said intake-pressure limit value is lower than ambient pressure.

7. A method for operating an internal combustion engine having an intake tract having an intake pressure and a corresponding combustion-air quantity, said internal combustion engine also includes an exhaust tract having an exhaust pressure, said method comprising:

providing an exhaust-gas turbocharger with a turbine disposed in said exhaust tract and a compressor disposed in said intake tract, said turbine and said compressor being interconnected, said turbine having variable turbine geometry to control the rotation thereof;

providing a throttle valve disposed in said intake tract;

operating said exhaust-gas turbocharger in a compression range;

operating said exhaust-gas turbocharger in a throttling range;

dimensioning said combustion air quantity exclusively with said exhaust-gas turbocharger while in said compression range or in said throttling range when said intake pressure exceeds an intake-pressure limit value; and dimensioning said combustion air quantity exclusively with said throttle valve while said intake pressure is below said intake-pressure limit value.

8. The method as set forth in claim 7, wherein said exhaust-gas turbocharger is in said throttling range while said dimensioning of said combustion air quantity is performed exclusively by said throttle valve.

9. An internal combustion engine having an intake tract having an intake pressure and a corresponding combustion-air quantity, said internal combustion engine also includes an exhaust tract having an exhaust pressure, said internal combustion engine comprising:

an exhaust gas turbocharger having a turbine provided in said exhaust tract and a compressor provided in said intake tract, said turbine and said compressor being interconnected, said turbine having a variable turbine geometry for the variable setting of an effective turbine cross section, said variable turbine geometry having a guide-vane cascade adjustable between an opening position with a maximum turbine inlet cross section and a build-up position with a minimum turbine inlet cross section, said guide-vane cascade is adjustable into position reversing the direction of rotation of a rotor of said exhaust-gas turbocharger responsive to actuating signals from a control system which is arranged in operative connection with the turbine.

10. The internal combustion engine as set forth in claim 9, wherein said guide-vane cascade includes adjustable guide vanes adjustable between two stop positions, said two stop positions bring about opposite directions of rotation of said exhaust-gas turbocharger.

11. The internal combustion engine as set forth in claim 9, wherein said guide vanes are adjustable through up to 180°.

12. An internal combustion engine having an intake tract having an intake pressure and a corresponding combustion-air quantity, said internal combustion engine also includes an exhaust tract having an exhaust pressure, said internal combustion engine comprising:

an exhaust gas turbocharger having a turbine provided in said exhaust tract and a compressor provided in said intake tract, said turbine and said compressor being interconnected, said turbine having a variable turbine geometry for the variable setting of an effective turbine cross section, said variable turbine geometry having a guide-vane cascade adjustable between an opening position with a maximum turbine inlet cross section and a build-up position with a minimum turbine inlet cross section, said guide-vane cascade is adjustable into position reversing the direction of rotation of a rotor of said exhaust-gas turbocharger, wherein said guide-vane cascade includes adjustable guide vanes adjustable between two stop positions, said two stop positions bring about opposite directions of rotation of said exhaust-gas turbocharger, and wherein said variable turbine geometry provides reversibility to the rotation of said rotor of the exhaust-gas turbocharger when commanded by actuating signals of a control system.

* * * * *